(12) United States Patent
Huang

(10) Patent No.: US 10,514,551 B2
(45) Date of Patent: Dec. 24, 2019

(54) STEREO DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 282 days.

(21) Appl. No.: 15/352,534

(22) Filed: Nov. 15, 2016

(65) Prior Publication Data

US 2018/0024372 A1 Jan. 25, 2018

(30) Foreign Application Priority Data

Jul. 20, 2016 (TW) .............................. 105122845 A

(51) Int. Cl.
*G02B 27/22* (2018.01)
*G02B 3/00* (2006.01)

(52) U.S. Cl.
CPC .......... *G02B 27/2214* (2013.01); *G02B 3/005* (2013.01); *G02B 3/0062* (2013.01); *G02B 27/2264* (2013.01)

(58) Field of Classification Search
CPC ..... H04N 13/04; H04N 13/0404–0406; H04N 13/0409; H04N 13/0497; H04N 13/0239; H04N 13/0055; H04N 13/0296; H04N 13/0431; H04N 13/0242; H04N 13/0048; H04N 13/021; H04N 13/0221; H04N 13/0037; H04N 13/0051; H04N 13/044; H04N 13/0438; H04N 13/0003; H04N 13/0422; H04N 13/0434; H04N 13/0459; H04N 9/3197; H04N 9/3105; G02B 27/22; G02B 27/2214; G02B 27/2228; G02B 27/2257; G02B 27/2235; G02B 27/225; G02B 27/2264; G02B 27/017; G02B 27/26; G03B 35/00–12; G03B 35/20;
(Continued)

(56) References Cited

U.S. PATENT DOCUMENTS 6,061,179 A * 5/2000 Inoguchi ............ G02B 27/2214
359/464
6,064,424 A 5/2000 van Berkel et al.
(Continued)

FOREIGN PATENT DOCUMENTS

TW I514006 B 12/2015

*Primary Examiner* — Stephone B Allen
*Assistant Examiner* — Jyotsna V Dabbi
(74) *Attorney, Agent, or Firm* — CKC & Partners Co., LLC

(57) ABSTRACT

A stereo display device includes a light source module, a display module, and first, second, and third lenticular lens. The light source module sequentially provides a plurality of groups of timing light. The first lenticular lens is disposed in front of the light source module. The second lenticular lens is disposed in front of the first lenticular lens. By two optical Fourier transforms performed by the first and second lenticular lens, different groups of timing light are respectively focus on different sub-regions of each of the pixels of the display module. The display module is disposed in front of the second lenticular lens and transforms the timing light focused on the pixels into a plurality of groups of pixel light. The third lenticular lens is disposed in front of the display module and directs the pixel light to a plurality of views.

10 Claims, 9 Drawing Sheets

(58) Field of Classification Search
CPC ........ G03B 31/06; G03B 31/00; G09G 3/003; G09G 3/36
USPC ........................................................ 359/463
See application file for complete search history.

(56) References Cited

U.S. PATENT DOCUMENTS

| | | | |
|---|---|---|---|
| 6,816,313 B2* | 11/2004 | Hara | G02B 27/017 359/619 |
| 8,427,527 B2 | 4/2013 | Visser et al. | |
| 2008/0204548 A1* | 8/2008 | Goulanian | G02B 27/2214 348/51 |
| 2012/0007899 A1* | 1/2012 | Kuijpers | G09G 3/003 345/690 |
| 2013/0321718 A1 | 12/2013 | Huang et al. | |

* cited by examiner

STEREO DISPLAY DEVICE

RELATED APPLICATIONS

This application claims priority to Taiwanese Application Serial Number 105122845, filed Jul. 20, 2016, which are herein incorporated by reference.

BACKGROUND

Technical Field

The present disclosure relates to a stereo display device.

Description of Related Art

In the human body, the positions of the left eye and the right eye are different, and the observed images of the left eye and the right eye may have slight differences, this is the fundamental cause of stereopsis. Auto-stereoscopic displays use the vision characteristic of the eyes to generate stereopsis.

The conventional method to generate stereopsis in technology uses a spatial-multiplex method, that is, pixels on the screen are divided into different groups by dispersing of the lens to form a plurality of views when light emitted from the pixels converges in the viewing distance. The two eyes of a human observer will observe images in different views, and this will result in the generation of stereopsis.

To further improve the stereo display device, persons in the industry have made every endeavor to discover new solutions. The application and improvement of the stereo display device has become one of the most important research topics.

SUMMARY

This disclosure provides a stereo display device to generate the spatial-multiplex effect and the time-multiplex effect by a simple optical configuration.

In one aspect of the disclosure, a stereo display device is provided. The stereo display device includes a light source module, a first lenticular lens, a second lenticular lens, a display module, and a third lenticular lens. The light source module sequentially provides a plurality of groups of timing light. The first lenticular lens is disposed in front of the light source module and respectively directs the timing light from the light source module to travel in a plurality of groups of directions. The light source module is located on a focal plane of the first lenticular lens. The second lenticular lens is disposed in front of the first lenticular lens. The display module is disposed in front of the second lenticular lens, and the display module is located on a focal plane of the second lenticular lens. The display module includes a plurality of pixels, and each of the pixels includes a plurality of sub-regions. The second lenticular lens focuses the timing light traveling in the groups of the directions to a plurality of groups of focus regions, and the focus regions respectively correspond to the sub-regions. The display module transforms the timing light focused on the focus regions into a plurality of groups of pixel light. The third lenticular lens is disposed in front of the display module and respectively directs the pixel light to a plurality of views.

In one or more embodiments, the stereo display device has a first direction and a second direction perpendicular to the first direction. The pixels are disposed along the first direction and the second direction. The first lenticular lens has a plurality of first cylindrical lenses, the second lenticular lens has a plurality of second cylindrical lenses, and the third lenticular lens has a plurality of third cylindrical lenses. The first cylindrical lenses are disposed slanted with respect to the first direction, the second cylindrical lenses are disposed slanted with respect to the first direction, and the third cylindrical lenses are disposed slanted with respect to the first direction.

In one or more embodiments, a long axis of each of the first cylindrical lenses, a long axis of each of the second cylindrical lenses, and a long axis of each of the third cylindrical lenses are parallel to each other.

In one or more embodiments, the display module is located on a focal plane of the third lenticular lens.

In one or more embodiments, each of the first cylindrical lenses has a pitch along the first direction. Each of the pixels includes a plurality of sub-pixels, and the sub-pixels have a spacing between adjacent two of the centers of the sub-pixels along the first direction. The first lenticular lens has a first focal length, and the second lenticular lens has a second focal length. A ratio of the pitch and the spacing is the same with a ratio of the first focal length and the second focal length.

In one or more embodiments, the light source module includes a plurality of white light sources.

In one or more embodiments, the first lenticular lens has a plurality of first cylindrical lenses, and the stereo display device has a third direction perpendicular to a long axis of each of the first cylindrical lenses. Each of the first cylindrical lenses is divided into K parts along the third direction, and the parts respectively correspond to K groups of the white light sources. The first lenticular lens respectively directs K groups of the timing light to travel in K groups of the directions. Each of the pixels includes K sub-regions. The second lenticular lens respectively focuses the K groups of the timing light traveling in the K groups of the directions to K groups of the focus regions. The K groups of the focus regions respectively correspond to the K sub-regions.

In one or more embodiments, the light source module includes a plurality of red light sources, a plurality of green light sources, and a plurality of blue light sources.

In one or more embodiments, the first lenticular lens has a plurality of first cylindrical lenses. The stereo display device has a third direction perpendicular to a long axis of each of the first cylindrical lenses. Each of the first cylindrical lenses is divided into 3K parts along the third direction. The parts respectively correspond to K groups of the red light sources, K groups of the green light sources, and K groups of the blue light sources. The K groups of the red light sources, the K groups of the green light sources, and the K groups of the blue light sources form 3K groups of the timing light in K timings. The first lenticular lens respectively directs the 3K groups of the timing light to travel in 3K groups of the directions. Each of the pixels includes K sub-regions, and each of the sub-regions includes a red sub-pixel sub-region, a blue sub-pixel sub-region, and a green sub-pixel sub-region. The second lenticular lens respectively focuses the 3K groups of the timing light traveling in the 3K groups of the directions to 3K groups of the focus regions, and the 3K groups of the focus regions respectively correspond to the K red sub-pixel sub-regions, the K blue sub-pixel sub-regions, and the K green sub-pixel sub-regions.

In one or more embodiments, a number of the sub-regions is K. For each of the pixels, the K sub-regions respectively transform the timing light into K pixel light, and the third lenticular lens respectively directs the K pixel light to K views.

By performing two optical Fourier transforms on different groups of the timing light from the light source module by the first lenticular lens and the second lenticular lens, different groups of the timing light will be respectively focused to different sub-regions of each of the pixels. Because different groups of the timing light focused to different sub-regions of each of the pixels are respectively generated in different timings, pixels can display different images at different timings, such that the pixel light transformed from different groups of the timing light focused to different sub-regions of the pixels display different images. Since the pixel light formed by different sub-regions of the pixels will be directed to different views by the third lenticular lens, the pixel light formed in different timings will be directed to different views by the third lenticular lens. For example, when there are a first timing and a second timing in a cycle, the pixel light formed in the first timing is directed to nine views by the third lenticular lens, and the pixel light formed in the second timing is directed to other nine views by the third lenticular lens, the image resolution observed by the user in each view will be one-ninth of the resolution of the display module 140, but eighteen images in eighteen views are generated by the stereo display device. In other words, the stereo display device uses a simple optical configuration to generate the spatial-multiplex effect and the time-multiplex effect. The spatial-multiplex effect generates K different images in K views when the image resolution observed by the user in each view is 1/K of the resolution of the display module. The time-multiplex effect makes the number of the views become K times of the original number (the multiplier equals the number of the timings), such that the number of views becomes N×K.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
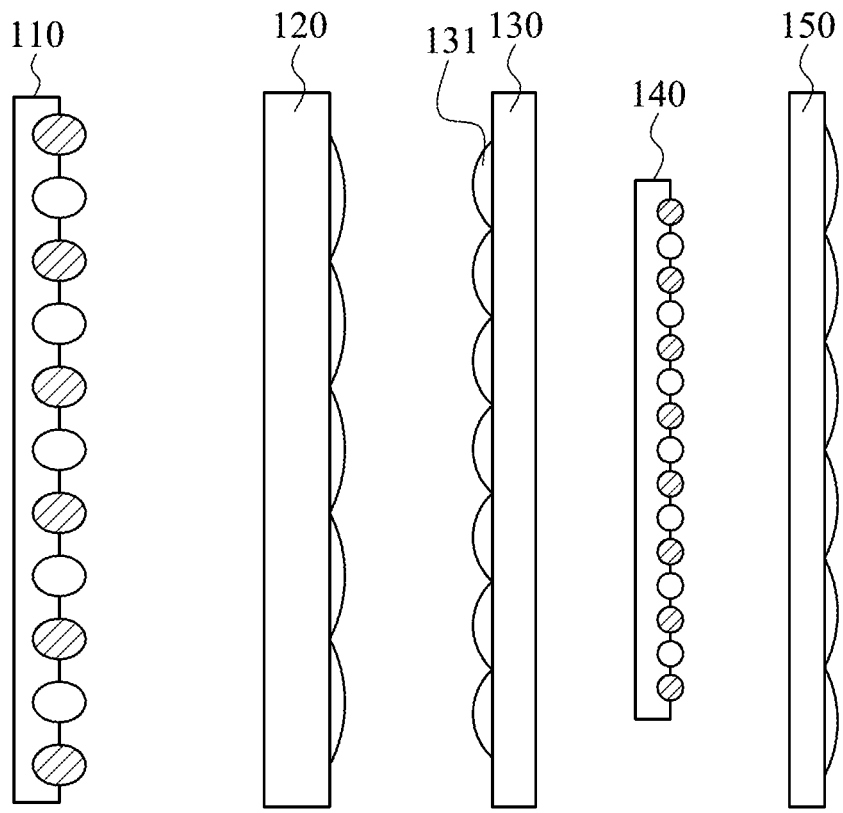
FIG. 1 is a schematic top view of a stereo display device according to one embodiment of this disclosure.

FIG. 1 is a schematic top view of a stereo display device 100 according to one embodiment of this disclosure. A stereo display device 100 is provided. The stereo display device 100 uses a simple optical configuration (mainly composed of three lenticular lenses) to generate the spatial-multiplex effect and the time-multiplex effect.

As shown in FIG. 1, the stereo display device 100 includes a light source module 110, a first lenticular lens 120, a second lenticular lens 130, a display module 140, and a third lenticular lens 150. The light source module 110 sequentially provides a plurality of groups of timing light according to a plurality of timings in a cycle. The first lenticular lens 120 is disposed in front of the light source module 110 (along the light path direction) and respectively directs the timing light from the light source module 110 to travel in a plurality of groups of directions. The light source module 110 is located on a focal plane of the first lenticular lens 120. The second lenticular lens 130 is disposed in front of the first lenticular lens 120. The display module 140 is disposed in front of the second lenticular lens 130, and the display module 140 is located on a focal plane of the second lenticular lens 130. The display module 140 includes a plurality of pixels 141, and each of the pixels 141 includes a plurality of sub-regions. The second lenticular lens 130 focuses the timing light traveling in the groups of the directions to a plurality of groups of focus regions, and the focus regions respectively correspond to different sub-regions. The display module 140 transforms the timing light focused on different focus regions into a plurality of groups of pixel light (the detailed information will be described thereafter). The third lenticular lens 150 is disposed in front of the display module 140 and respectively directs the pixel light to a plurality of views.

Figure 2:
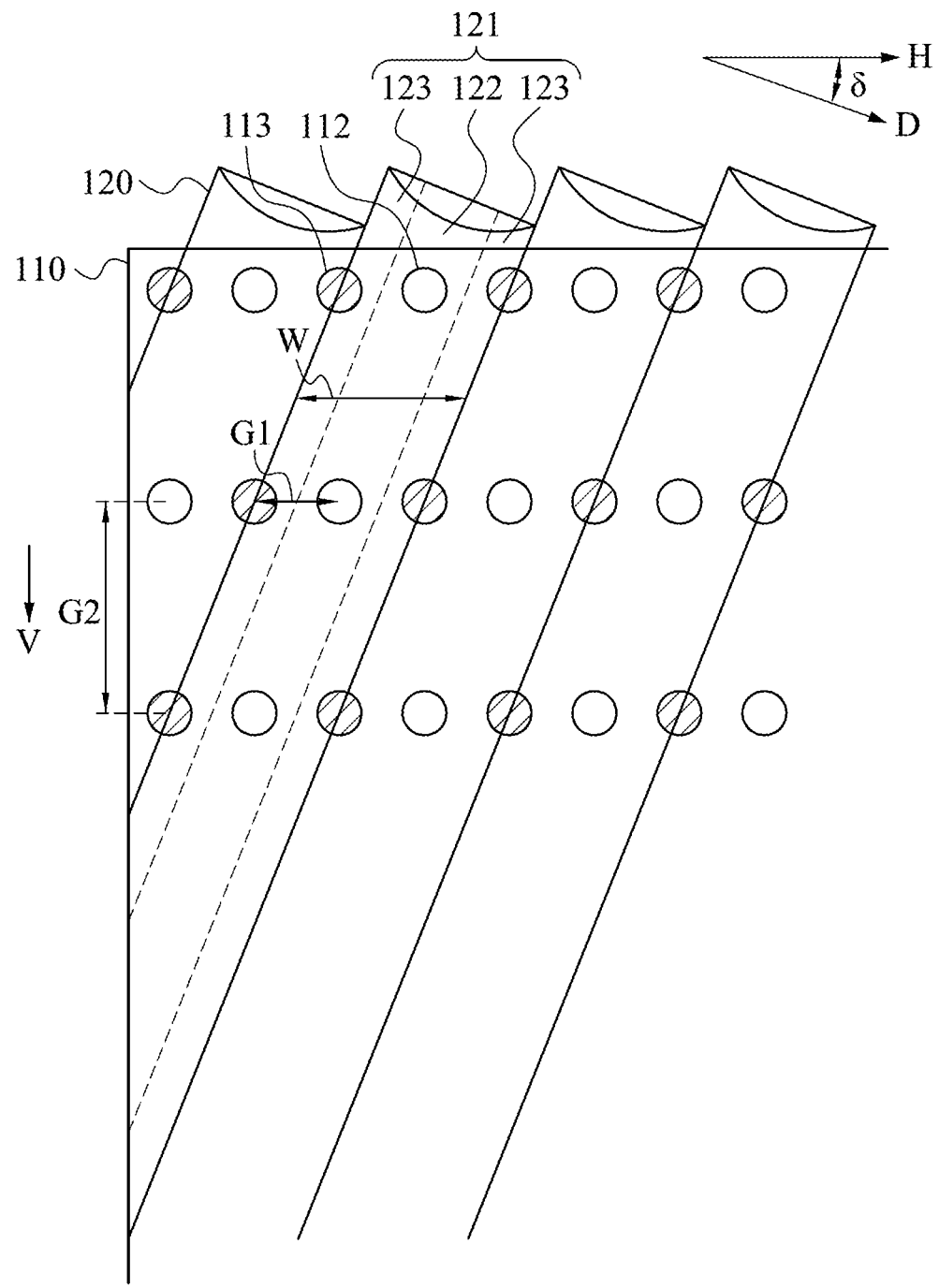
FIG. 2 is a schematic partial front view of a light source module and a first lenticular lens according to one embodiment of this disclosure.

FIG. 2 is a schematic partial front view of the light source module 110 and the first lenticular lens 120 according to one embodiment of this disclosure. As shown in FIG. 2, the light source module 110 includes a plurality of first white light sources 112 and a plurality of second white light sources 113. The stereo display device 100 has a first direction H and a second direction V perpendicular to the first direction H. In some embodiments, the first direction H is a horizontal direction, and the second direction V is a vertical direction. The white light sources, which include the first white light sources 112 and the second white light source 113, are disposed along the first direction H and the second direction V. The first lenticular lens 120 has a plurality of first cylindrical lenses 121, and the first cylindrical lenses 121 are disposed slanted with respect to the first direction H and the second direction V.

In some embodiments, the first white light sources 112 and the second white light sources 113 are alternately disposed. The first white light sources 112 and the second white light sources 113 are light-emitting diodes. Embodiments of this disclosure are not limited thereto. The person having ordinary skill in the art can make proper modifications to the first white light sources 112 and the second white light sources 113 depending on the actual application.

A spacing G1 is between the centers of the white light sources along the first direction H, and a spacing G2 is between the centers of the white light sources along the second direction V. The spacing G2 is three times as much as the spacing G1.

The stereo display device 100 further has a third direction D perpendicular to the long axis of each of the first cylindrical lenses 121. Each of the first cylindrical lenses 121 is divided into a center part 122 and an edge part 123. The center part 122 corresponds to the first white light sources 112, and the edge part 123 corresponds to the second white light sources 113. The first white light sources 112 emit first timing light in a first timing, and the second white light sources 113 emit second timing light in a second timing.

The orthogonal projection of the center part 122 along a direction perpendicular to the first direction H and the second direction V overlaps the deposition position of the first white light source 112, i.e., the center part 122 corresponds to the first white light sources 112.

The orthogonal projection of the edge part 123 along a direction perpendicular to the first direction H and the second direction V overlaps the deposition position of the second white light source 113, i.e., the edge part 123 corresponds to the second white light sources 113.

Figure 3:
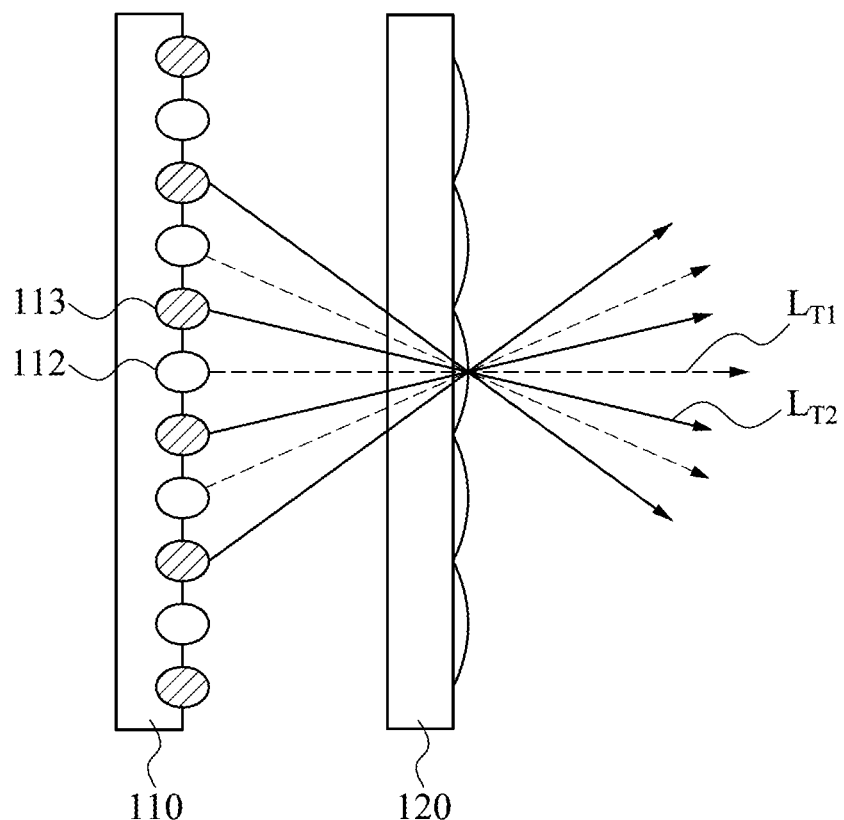
FIG. 3 is a schematic side view of the light source module and the first lenticular lens with light paths according to one embodiment of this disclosure.

FIG. 3 is a schematic side view of the light source module 110 and the first lenticular lens 120 with light paths according to one embodiment of this disclosure. As shown in FIG. 3, the first lenticular lens 120 directs the first timing light $L_{T1}$ emitted by the first white light sources 112 in the first timing to travel in a first group of directions and directs the second timing light $L_{T2}$ emitted by the second white light sources 113 in the second timing to travel in a second group of directions.

Figure 4:
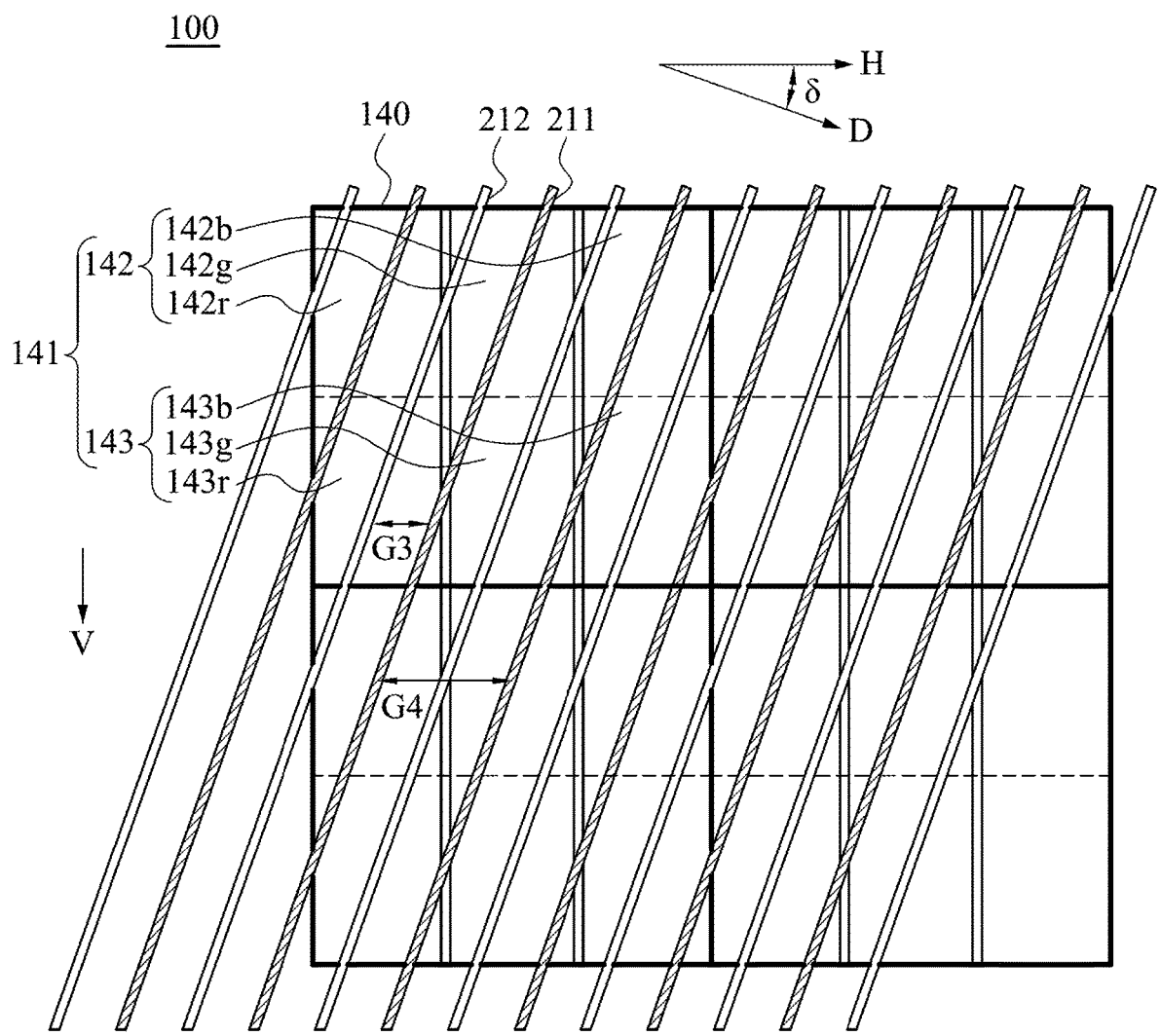
FIG. 4 is a schematic partial front view of a display module according to one embodiment of this disclosure.

FIG. 4 is a schematic partial front view of the display module 140 according to one embodiment of this disclosure. As shown in FIG. 1, FIG. 3, and FIG. 4, the pixels 141 are disposed along the first direction H and the second direction V. Each of the pixels includes a first sub-region 142 and a second sub-region 143. The second lenticular lens 130 focuses the first timing light $L_{T1}$ traveling in the first group of directions to first focus regions 211 and focuses the second timing light $L_{T2}$ traveling in the second group of directions to second focus regions 212. The first focus regions 211 corresponds to the first sub-regions 142, and the second focus regions 212 corresponds to the second sub-regions 143.

Therefore, in the display module 140, the first sub-region 142 of each of the pixels 141 transforms the first timing light $L_{T1}$ focused to the first focus regions 211 into pixel light, and the second sub-region 143 of each of the pixels 141 transforms the second timing light $L_{T2}$ focused to the second focus regions 212 into pixel light.

Because the light source module 110 is located on the focal plane of the first lenticular lens 120, and the display module 140 is located on the focal plane of the second lenticular lens 130, two optical Fourier transforms are performed on the first timing light $L_{T1}$ from the first white light sources 112 and the second timing light $L_{T2}$ from the second white light sources 113 by the first lenticular lens 120 and the second lenticular lens 130. After the two optical Fourier transforms are performed, the first timing light $L_{T1}$ and the second timing light $L_{T2}$ will be naturally focuses to the first focus regions 211 and the second focus regions 212. The first focus regions 211 and the second focus regions 212 are strip-shaped, and the long axes of the first focus regions 211 and the second regions 212 are perpendicular to the third direction D. A spacing G3 between the first focus region 211 and the adjacent second focus region 212 along the first direction H is determined by the first focal length of the first lenticular lens 120, the second focal length of the second lenticular lens 130, and the spacing G1 (see FIG. 2) between the centers of the white light sources, which includes the first white light sources 112 and the second white light sources 113, along the first direction H.

The first sub-regions 142 and the second sub-regions 143 are disposed along the second direction V. Each of the first sub-regions 142 includes a red sub-pixel first sub-region 142r, a green sub-pixel first sub-region 142g, and a blue-pixel first sub-region 142b. Each of the second sub-regions 143 includes a red sub-pixel second sub-region 143r, a green sub-pixel second sub-region 143g, and a blue-pixel second sub-region 143b. The red sub-pixel first sub-region 142r and the red sub-pixel second sub-region 143r form a red sub-pixel. The green sub-pixel first sub-region 142g and the green sub-pixel second sub-region 143g form a green sub-pixel. The blue sub-pixel first sub-region 142b and the blue sub-pixel second sub-region 143b form a blue sub-pixel. The red sub-pixel, the green sub-pixel, and the blue sub-pixel are disposed side by side along the first direction H.

As shown in FIG. 2 and FIG. 4, a spacing G4 is between the centers of the sub-pixels, which includes the red sub-pixels, the green sub-pixels, and the blue sub-pixels, along the first direction H. The spacing G3 between the first focus region 211 and the adjacent second focus region 212 along the first direction H is one-half of the spacing G4. The ratio of the spacing G1 between the centers of the white light sources, which includes the first white light sources 112 and the second white light sources 113, along the first direction H and the spacing G3 is the same as the ratio of the first focal length of the first lenticular lens 120 and the second focal length of the second lenticular lens 130. In other words, by well designing the ratio of the first focal length of the first lenticular lens 120 and the second focal length of the second lenticular lens 130, the first timing light $L_{T1}$ emitted by the first white light sources 112 will be properly focused to the centers of the red sub-pixel first sub-region 142r, the green sub-pixel first sub-region 142g, and the blue-pixel first sub-region 142b, and the second timing light $L_{T2}$ emitted by the second white light sources 113 will be properly focused to the centers of the red sub-pixel second sub-region 143r, the green sub-pixel second sub-region 143g, and the blue-pixel second sub-region 143b.

Each of the first cylindrical lenses 121 has a pitch W along the first direction H. The spacing G3 between the first focus region 211 and the adjacent second focus region 212 along the first direction H can also be determined by the first focal length of the first lenticular lens 120, the second focal length of the second lenticular lens 130, and the pitch W of the first cylindrical lens 121 along the first direction H. In some embodiments, the spacing G1 is one-half of the pitch W. Therefore, the ratio of one-half of the pitch W and the spacing G3 is the same as the ratio of the first focal length of the first lenticular lens 120 and the second focal length of the second lenticular lens 130.

As shown in FIG. 2, the angle δ between the first direction H and the third direction D is $\tan^{-1}(\frac{1}{3})$. Embodiments of this disclosure are not limited thereto. In other embodiments, the magnitude of the angle δ between the first direction H and the third direction D may be different from the magnitude of the angle δ in this embodiment.

Figure 5:
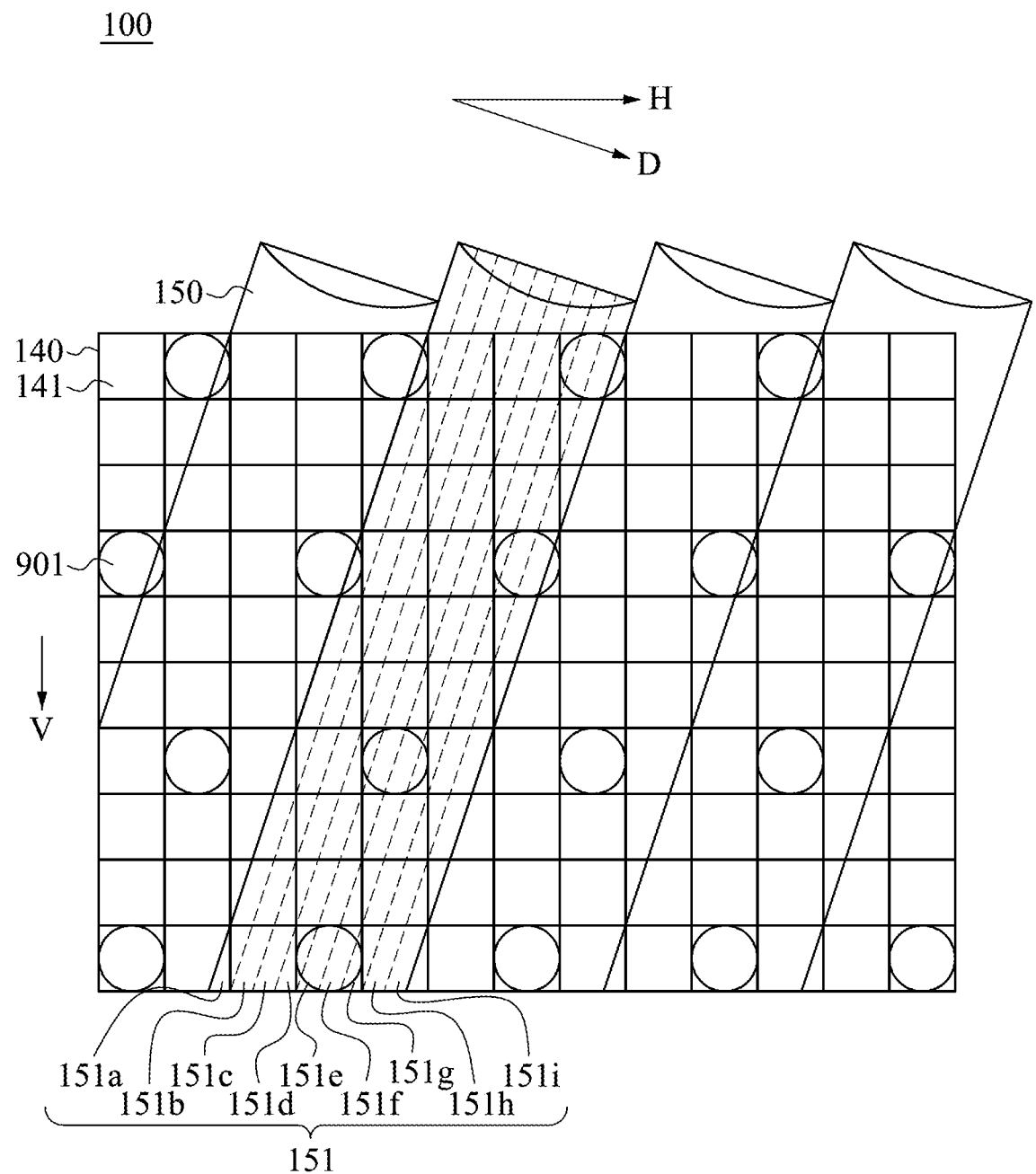
FIG. 5 is a schematic partial front view of the display module and a third lenticular lens according to one embodiment of this disclosure.

FIG. 5 is a schematic partial front view of the display module 140 and the third lenticular lens 150 according to one embodiment of this disclosure. As shown in FIG. 5, the third lenticular lens 150 has a plurality of third cylindrical lenses 151, and the third cylindrical lenses 151 are disposed slanted with respect to the first direction H and the second direction V. The long axis of each of the third cylindrical lenses 151 is perpendicular to the third direction D. Each of the third cylindrical lenses 151 is divided into a first part 151a, a second part 151b, a third part 151c, a fourth part 151d, a fifth part 151e, a sixth part 151f, a seventh part 151g, an eighth part 151h, and a ninth part 151i along the third direction D. The first part 151a, the second part 151b, the third part 151c, the fourth part 151d, the fifth part 151e, the sixth part 151f, the seventh part 151g, the eighth part 151h, and the ninth part 151i respectively correspond to nine different groups of the pixels 141.

Each of the first part 151a, the second part 151b, the third part 151c, the fourth part 151d, the fifth part 151e, the sixth part 151f, the seventh part 151g, the eighth part 151h, and the ninth part 151i respectively have a left portion (not shown in Figs.) and a right portion (not shown in Figs.). The left portions correspond to the first sub-regions 142 (see FIG. 4) of the pixels 141, and the right portions correspond to the second sub-regions 143 (see FIG. 4) of the pixels 141. In other words, each of the third cylindrical lenses 151 is divided into eighteen sub-parts respectively corresponding to the first sub-regions 142 and the second sub-regions 143 of nine different groups of the pixels 141.

Therefore, the third lenticular lens 150 respectively directs eighteen groups of the pixel light generated by the first sub-regions 142 and the second sub-regions 143 of nine different groups of the pixels 141 to eighteen views.

Further, in one of the views, the user will see pixels 141 depicted by marks 901. The user will see pixels 141 in similar patterns in other views. Therefore, the image resolution observed by the user in each view will be one-ninth of the resolution of the display module 140.

The orthogonal projections of the eighteen sub-parts along a direction perpendicular to the first direction H and the second direction V respectively overlap the deposition positions of the first sub-regions 142 and the second sub-regions 143 of different groups of the pixels 141, i.e., the left portions and the right portions of first part 151a, the second part 151b, the third part 151c, the fourth part 151d, the fifth part 151e, the sixth part 151f, the seventh part 151g, the eighth part 151h, and the ninth part 151i respectively correspond to the first sub-regions 142 and the second sub-regions 143 of different groups of the pixels 141.

By performing two optical Fourier transforms on the first timing light $L_{T1}$ and the second timing light $L_{T2}$ from the light source module 110 by the first lenticular lens 120 and the second lenticular lens 130, the first timing light $L_{T1}$ and the second timing light $L_{T2}$ will be respectively focus to the first sub-region 142 and the second sub-region 143 of each of the pixels 141. Because the first timing light $L_{T1}$ and the second timing light $L_{T2}$ are respectively generated in the first timing and the second timing, pixels 141 can display different images in the first timing and the second timing, such that the pixel light transformed from the first timing light $L_{T1}$ focused to the first sub-regions 142 of the pixels 141 and the pixel light transformed from the second timing light $L_{T2}$ focused to the second sub-regions 143 of the pixels 141 display different images. Because pixel light formed by the first sub-region 142 and the second sub-region 143 of the pixels will be directed to different views by the third lenticular lens 151 (because the deposition positions of the first sub-regions 142 and the second sub-regions 143 are different), the pixel light formed in the first timing will be directed to nine views by the third lenticular lens 150, and the pixel light formed in the second timing will be directed to other nine views by the third lenticular lens 150. Therefore, the image resolution observed by the user in each view will be one-ninth of the resolution of the display module 140, but eighteen images in eighteen views are generated by the stereo display device 100. In other words, the stereo display device 100 uses a simple optical configuration to generate the spatial-multiplex effect and the time-multiplex effect. The spatial-multiplex effect generates nine different images in nine views when the image resolution observed by the user in each view is one-ninth of the resolution of the display module 140. The time-multiplex effect doubles the number of the views (the multiplier equals the number of the timing), such that the number of views becomes eighteen.

As shown in FIG. 1 and FIG. 2, the second lenticular lens 130 has a plurality of second cylindrical lenses 131, and the second cylindrical lenses 131 are disposed slanted with respect to the first direction H and the second direction V.

The long axis of each of the first cylindrical lenses 121, the long axis of each of the second cylindrical lenses 131, and the long axis of each of the third cylindrical lenses 151 are parallel to each other. Embodiments of this disclosure are not limited thereto. The person having ordinary skill in the art can make proper modifications to the depositions directions of the long axis of each of the first cylindrical lenses 121, the long axis of each of the second cylindrical lenses 131, and the long axis of each of the third cylindrical lenses 151 depending on the actual application.

The display module 140 is located on the focal plane of the third lenticular lens 150. Embodiments of this disclosure are not limited thereto. The person having ordinary skill in the art can make proper modifications to the display module 140 and the third lenticular lens 150 depending on the actual application.

Figure 6:
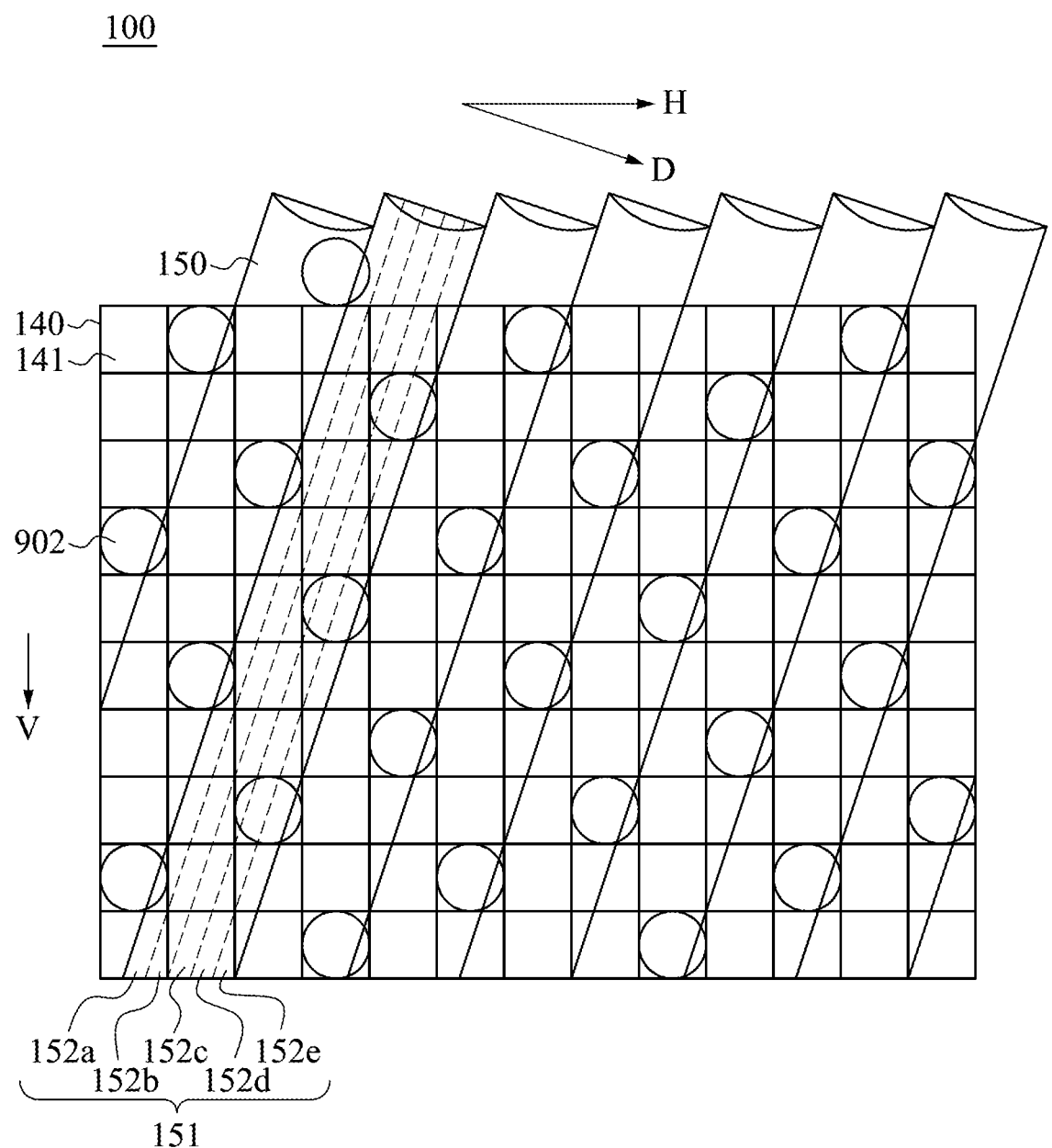
FIG. 6 is a schematic partial front view of the display module and the third lenticular lens according to another embodiment of this disclosure.

FIG. 6 is a schematic partial front view of the display module 140 and the third lenticular lens 150 according to another embodiment of this disclosure. As shown in FIG. 6, the stereo display device 100 of this embodiment is similar to the stereo display device 100 of the aforementioned embodiments, and the main difference is that, in this embodiment, each of the third cylindrical lenses 151 is divided into a first part 152a, a second part 152b, a third part 152c, a fourth part 152d, and a fifth part 152e. The first part 152a, the second part 152b, the third part 152c, the fourth part 152d, and the fifth part 152e respectively correspond to different groups of pixels 141.

Each of the first part 152a, the second part 152b, the third part 152c, the fourth part 152d, and the fifth part 152e respectively has a left portion (not shown in Figs.) and a right portion (not shown in Figs.). The left portions correspond to the first sub-regions 142 of the pixels 141, and the right portions correspond to the second sub-regions 143 of the pixels 141. In other words, each of the third cylindrical lenses 151 is divided into ten sub-parts respectively corresponding to the first sub-regions 142 and the second sub-regions 143 of five different groups of the pixels 141.

Therefore, the third lenticular lens 150 respectively directs ten groups of the pixel light generated by the first sub-regions 142 and the second sub-regions 143 of five different groups of the pixels 141 to ten views.

Further, in one of the views, the user will see pixels 141 depicted by marks 902. The user will see pixels 141 in similar patterns in other views. Therefore, the image resolution observed by the user in each view will be one-fifth of the resolution of the display module 140.

Figure 7:
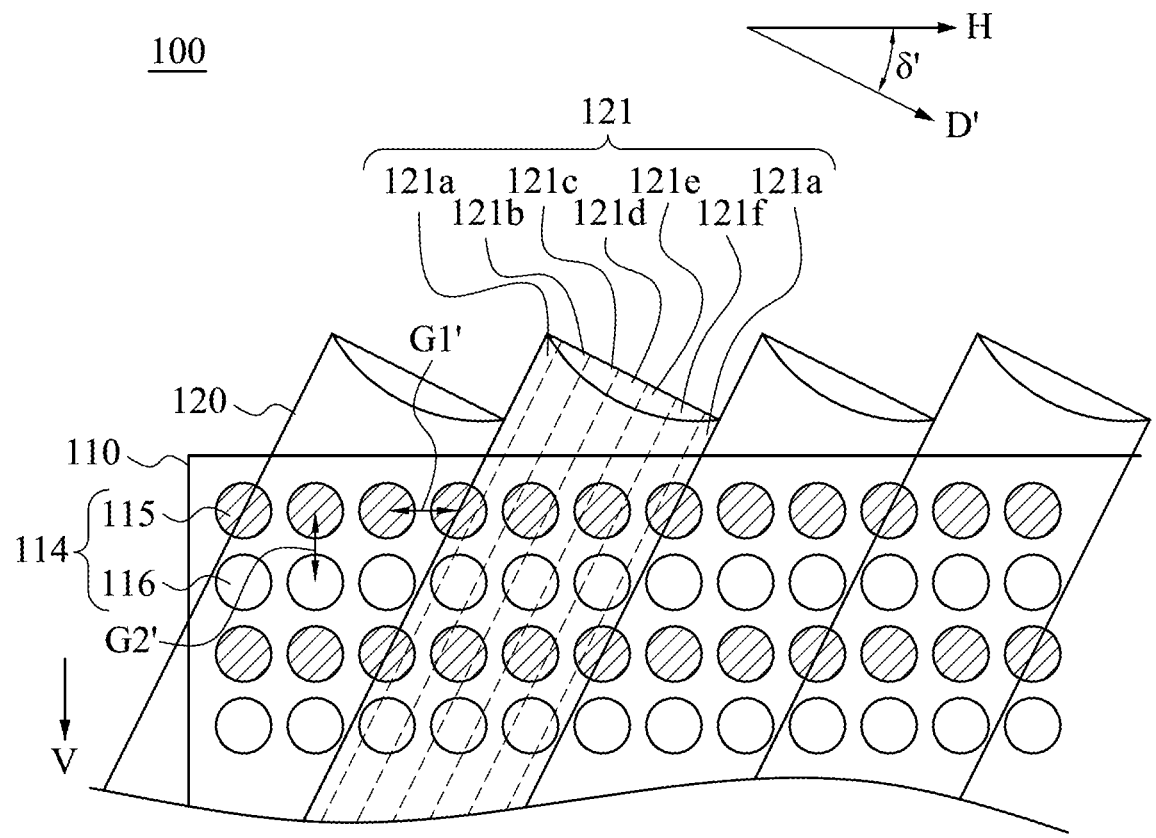
FIG. 7 is a schematic partial front view of the light source module and the first lenticular lens according to another embodiment of this disclosure.
Figure 8:
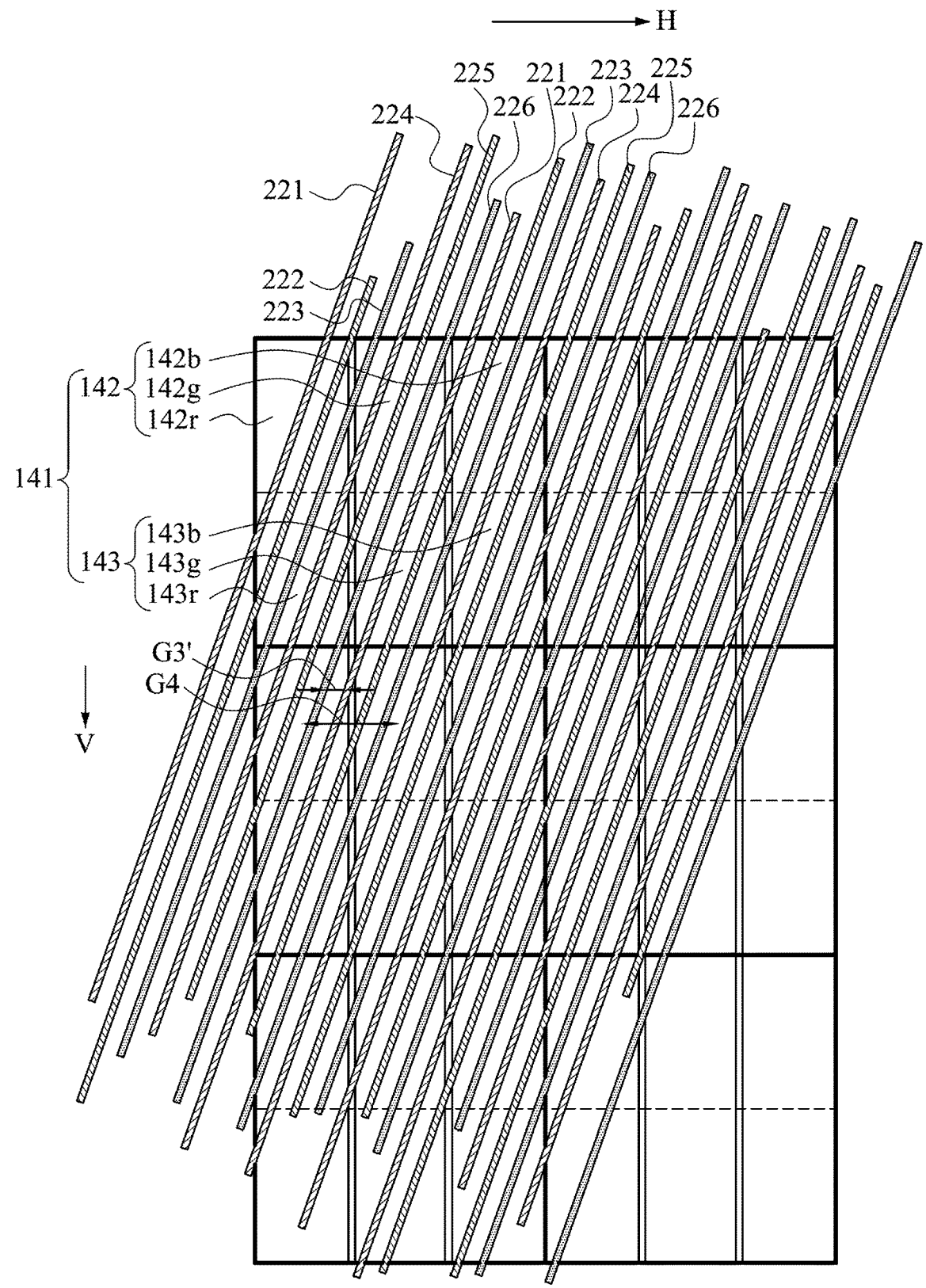
FIG. 8 is a schematic partial front view of the display module according to another embodiment of this disclosure.
Figure 9:
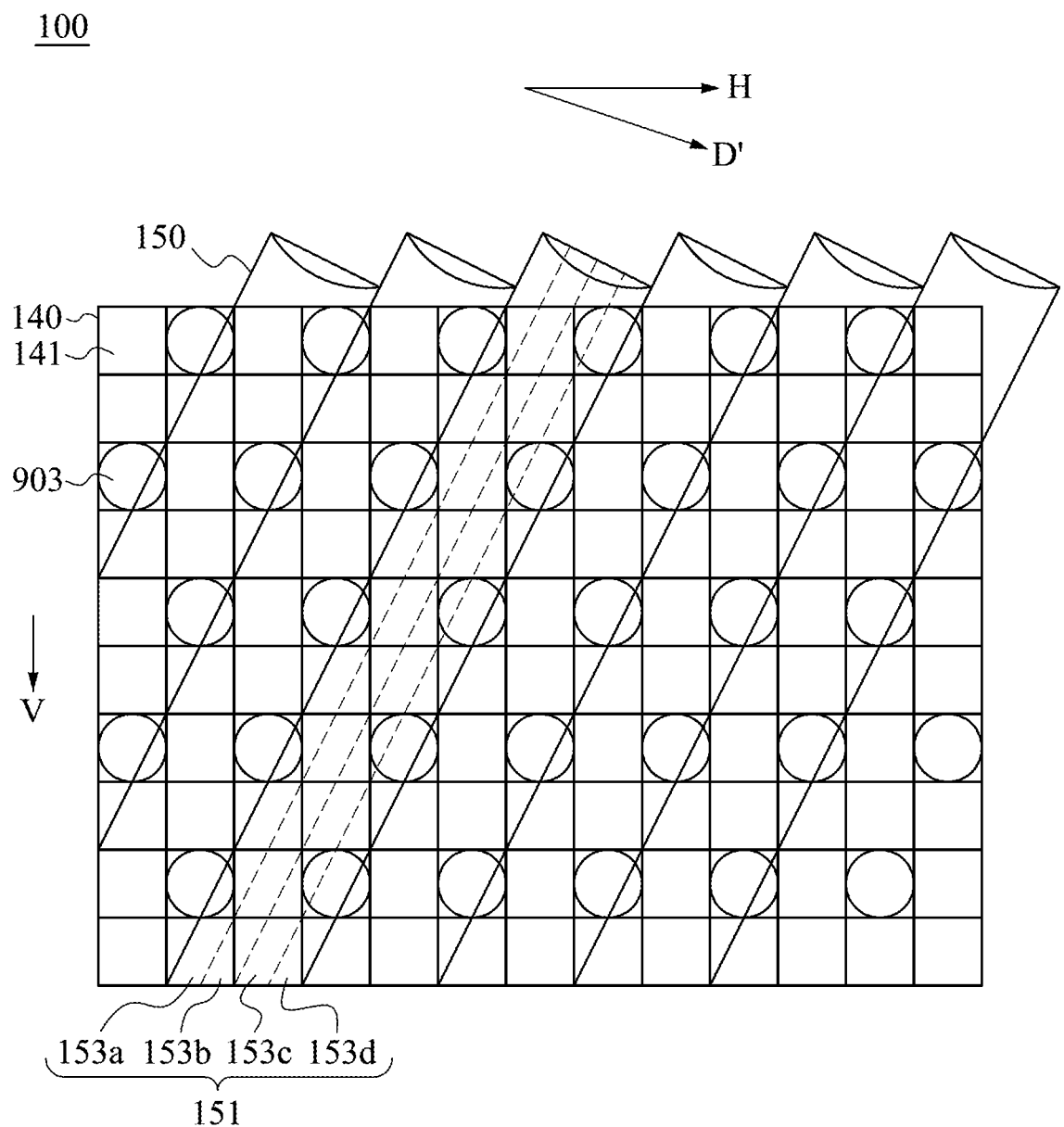
FIG. 9 is a schematic partial front view of the display module and the third lenticular lens according to another embodiment of this disclosure.

FIG. 7 is a schematic partial front view of the light source module 110 and the first lenticular lens 120 according to another embodiment of this disclosure. FIG. 8 is a schematic partial front view of the display module 140 according to another embodiment of this disclosure. FIG. 9 is a schematic partial front view of the display module 140 and the third lenticular lens 150 according to another embodiment of this disclosure. As shown in FIG. 7, FIG. 8, and FIG. 9, the stereo display device 100 of this embodiment is similar to the stereo display device 100 of the aforementioned embodiments, and the main differences are described below.

As shown in FIG. 7, the light source module 110 includes a plurality of light sources 114, and the light sources 114 are disposed along the first direction H and the second direction V. The stereo display device 100 further has a fourth direction D' perpendicular to the long axis of each of the first cylindrical lenses 121. The angle δ' between the first direction H and the fourth direction D' is $\tan^{-1}(1/2)$. Embodiments of this disclosure are not limited thereto. In other embodiments, the magnitude of the angle δ' between the first direction H and the fourth direction D' may be different from the magnitude of the angle δ' in this embodiment.

A spacing G1' is between the centers of the light sources 114 along the first direction H, and a spacing G2' is between the centers of the light sources 114 along the second direction V. The spacing G1' equals the spacing G2'.

Each of the first cylindrical lenses 121 is divided into a first part 121a, a second 121b, a third part 121c, a fourth part 121d, a fifth part 121e, and a sixth part 121f. The first part 121a, the second 121b, the third part 121c, the fourth part 121d, the fifth part 121e, and the sixth part 121f respectively correspond to six different groups of the light sources 114.

Therefore, similar to FIG. 3, the first lenticular lens 120 respectively directs light emitted by the six groups of the light sources 114 to travel in six different groups of directions.

The orthogonal projections of the first part 121a, the second 121b, the third part 121c, the fourth part 121d, the fifth part 121e, and the sixth part 121f along a direction perpendicular to the first direction H and the second direction V respectively overlap the deposition positions of six different groups of the light sources 114, i.e., the first part 121a, the second 121b, the third part 121c, the fourth part 121d, the fifth part 121e, and the sixth part 121f respectively correspond to six different groups of the light sources 114.

The light sources 114 are further divided into a plurality of first light sources 115 and a plurality of second light sources 116. The first light sources 115 emit first timing light in the first timing, and the second light sources 116 emit second timing light in the second timing. The first part 121a, the third part 121c, and the fifth part 121e correspond to the first light sources 115, and the second part 121b, the fourth part 121d, and the sixth part 121f correspond to the second light sources 116.

In some embodiments, the first light sources 115 and the second light sources 116 are light-emitting diodes. Embodiments of this disclosure are not limited thereto. The person having ordinary skill in the art can make proper modifications to the first light sources 115 and the second light sources 116 depending on the actual application.

As shown in FIG. 1, FIG. 7, and FIG. 8, the second lenticular lens 130 focuses light traveling in different groups of directions to first focus regions 221, second focus regions 222, third focus regions 223, fourth focus regions 224, fifth focus regions 225, and sixth focus regions 226. The first focus regions 221, the third focus regions 223, and the fifth focus regions 225 correspond to the first sub-regions 142, and the second focus regions 222, the fourth focus regions 224, and the sixth focus regions 226 correspond to the second sub-regions 143.

The first focus regions 221 correspond to the red sub-pixel first sub-regions 142r. The third focus regions 223 correspond to the blue sub-pixel first sub-regions 142b. The fifth focus regions 225 correspond to the green sub-pixel first sub-regions 142g. The second focus regions 222 correspond to the green sub-pixel second sub-regions 143g. The fourth focus regions 224 correspond to the red sub-pixel second sub-regions 143r. The sixth focus regions 226 correspond to the blue sub-pixel second sub-regions 143b.

Light emitted by the first light sources 115 corresponding to the first parts 121a is focused to the first focus regions 221 after passing the first lenticular lens 120 and the second lenticular lens 130. Light emitted by the second light sources 116 corresponding to the second parts 121b is focused to the second focus regions 222 after passing the first lenticular lens 120 and the second lenticular lens 130. Light emitted by the first light sources 115 corresponding to the third parts 121c is focused to the third focus regions 223 after passing the first lenticular lens 120 and the second lenticular lens 130. Light emitted by the second light sources 116 corresponding to the fourth parts 121d is focused to the fourth focus regions 224 after passing the first lenticular lens 120 and the second lenticular lens 130. Light emitted by the first light sources 115 corresponding to the fifth parts 121e is focused to the fifth focus regions 225 after passing the first lenticular lens 120 and the second lenticular lens 130. Light emitted by the second light sources 116 corresponding to the sixth parts 121f is focused to the six focus regions 226 after passing the first lenticular lens 120 and the second lenticular lens 130.

Therefore, in the display module 140, the first sub-region 142 of each of the pixels 141 transforms the first timing light focused to the first focus regions 221, the third focus regions 223, and the fifth focus regions 225 into pixel light, and the second sub-region 143 of each of the pixels 141 transforms the second timing light focused to the second focus regions 222, the fourth focus regions 224, and the sixth focus regions 226 into pixel light.

Different focus regions respectively overlap the centers of different sub-regions of different sub-pixels, i.e., different focus regions correspond to different sub-regions of different sub-pixels. For example, the first focus regions 221 correspond to the red sub-pixel first sub-regions 142r, and the first focus regions 221 overlap the centers of the red sub-pixel first sub-regions 142r.

The first light sources 115 corresponding to the first parts 121a are red light sources. The second light sources 116 corresponding to the first parts 121b are green light sources. The first light sources 115 corresponding to the third parts 121c are blue light sources. The second light sources 116 corresponding to the fourth parts 121d are red light sources. The first light sources 115 corresponding to the fifth parts 121e are green light sources. The second light sources 116 corresponding to the sixth parts 121f are blue light sources. In other words, the light source module 110 includes a plurality of red light sources, a plurality of green light sources, and a plurality of blue light sources.

Therefore, light emitted by the red light sources corresponding to the first parts 121a is focused to the red sub-pixel first sub-regions 142r after passing the first lenticular lens 120 and the second lenticular lens 130. Light emitted by the green light sources corresponding to the second parts 121*b* is focused to the green sub-pixel second sub-regions 143*g* after passing the first lenticular lens 120 and the second lenticular lens 130. Light emitted by the blue light sources corresponding to the third parts 121*c* is focused to the blue sub-pixel first sub-regions 142*b* after passing the first lenticular lens 120 and the second lenticular lens 130. Light emitted by the red light sources corresponding to the fourth parts 121*d* is focused to the red sub-pixel second sub-regions 143*r* after passing the first lenticular lens 120 and the second lenticular lens 130. Light emitted by the green light sources corresponding to the fifth parts 121*e* is focused to the green sub-pixel first sub-regions 142*g* after passing the first lenticular lens 120 and the second lenticular lens 130. Light emitted by the blue light sources corresponding to the sixth parts 121*f* is focused to the blue sub-pixel second sub-regions 143*b* after passing the first lenticular lens 120 and the second lenticular lens 130.

It is noted that only light emitted by the red light sources can pass the red sub-pixels, and light emitted by the green light sources and the blue light sources can not pass the red sub-pixels. Therefore, only the red light focused to the first focus regions 221 and the fourth focus regions 224 can pass the red sub-pixel first sub-regions 142*r* and the red sub-pixel second sub-regions 143*r*, and other green light and blue light can not pass the red sub-pixel first sub-regions 142*r* and the red sub-pixel second sub-regions 143*r*. Therefore, for the red sub-pixel first sub-regions 142*r* and the red sub-pixel second sub-regions 143*r*, the green light and the blue light can be considered absent. Similarly, only the green light focused to the second focus regions 222 and the fifth focus regions 225 can pass the green sub-pixel first sub-regions 142*g* and the green sub-pixel second sub-regions 143*g*, and other light can be considered absent for the green sub-pixel first sub-regions 142*g* and the green sub-pixel second sub-regions 143*g*. Only the blue light focused to the third focus regions 223 and the sixth focus regions 226 can pass the blue sub-pixel first sub-regions 142*b* and the blue sub-pixel second sub-regions 143*b*, and other light can be considered absent for the blue sub-pixel first sub-regions 142*b* and the blue sub-pixel second sub-regions 143*b*.

Because the first light sources 115 corresponds to the first parts 121*a*, the third parts 121*c*, and the fifth parts 121*e*, the first lenticular lens 120 directs the first timing light emitted by the first light source 115 to travel in three different groups of directions, such that three different groups of light are formed. Similarly, because the second light sources 116 corresponds to the second parts 121*b*, the fourth parts 121*d*, and the sixth parts 121*f*, the first lenticular lens 120 directs the second timing light emitted by the second light source 116 to travel in three different groups of directions, such that three different groups of light are formed.

The spacing G3' between the focus regions and the adjacent focus regions along the first direction H can be determined by the first focal length of the first lenticular lens 120, the second focal length of the second lenticular lens 130, and the pitch W of the first cylindrical lens 121 along the first direction H.

In some embodiments, the spacing G3' between the focus regions and the adjacent focus regions along the first direction H is one-fourth of the spacing G4 between the centers of the sub-pixels, which include the red sub-pixels, the green sub-pixels, and the blue sub-pixels, along the first direction H. The ratio of one-sixth of the pitch W of the first cylindrical lens 121 along the first direction H and the spacing G3' equals the ratio of the first focal length of the first lenticular lens 120 and the second focal length of the second lenticular lens 130. Therefore, the ratio of one-sixth of the pitch W and one-fourth of the spacing G4 equals the ratio of the first focal length and the second focal length.

The spacing G3' between the focus regions and the adjacent focus regions along the first direction H can also be determined by the first focal length of the first lenticular lens 120, the second focal length of the second lenticular lens 130, and the spacing G1' between the centers of the light sources 114 and the adjacent light source 114 along the first direction H. This detailed information will not be described here.

FIG. 9 is a schematic partial front view of the display module 140 and the third lenticular lens 150 according to another embodiment of this disclosure. As shown in FIG. 9, the long axis of each of the third cylindrical lenses 151 is perpendicular to the fourth direction D. Each of the third cylindrical lenses 151 is divided into a first part 153*a*, a second part 153*b*, a third part 153*c*, and a fourth part 153*d*. The first part 153*a*, the second part 153*b*, the third part 153*c*, and the fourth part 153*d* respectively correspond to different groups of the pixels 141.

Each of the first part 153*a*, the second part 153*b*, the third part 153*c*, and the fourth part 153*d* respectively have a left portion (not shown in Figs.) and a right portion (not shown in Figs.). The left portions correspond to the first sub-regions 142 (see FIG. 8) of the pixels 141, and the right portions correspond to the second sub-regions 143 (see FIG. 8) of the pixels 141, i.e., each of the third cylindrical lenses 151 is divided into eight sub-parts respectively corresponding to the first sub-regions 142 and the second sub-regions 143 of four different groups of the pixels 141.

Therefore, the third lenticular lens 150 respectively directs eight groups of the pixel light generated by the first sub-regions 142 and the second sub-regions 143 of four different groups of the pixels 141 to eight views.

Further, in one of the views, the user will see pixels 141 depicted by marks 903. The user will see pixels 141 in similar patterns in other views. Therefore, the image resolution observed by the user in each view will be one-fourth of the resolution of the display module 140.

The orthogonal projections of the eight sub-parts along a direction perpendicular to the first direction H and the second direction V respectively overlap the deposition positions of the first sub-regions 142 and the second sub-regions 143 of different groups of the pixels 141, i.e., the left portions and the right portions of first part 153*a*, the second part 153*b*, the third part 153*c*, and the fourth part 153*d* respectively correspond to the first sub-regions 142 and the second sub-regions 143 of different groups of the pixels 141.

Some features of the stereo display device 100 can be summarized from the aforementioned embodiments, and the features are described below.

In some embodiments, each of the first cylindrical lenses 121 has a pitch W along the first direction H. A spacing is between the centers of the sub-pixels along the first direction H. The first lenticular lens 120 has a first focal length, and the second lenticular lens 130 has a second focal length. The ratio of the pitch W and the spacing equals the ratio of the first focal length and the second focal length.

When the light source module 110 includes a plurality of white light sources, the stereo display device 100 has a direction perpendicular to the long axis of each of the first cylindrical lenses 121. Each of the first cylindrical lenses is divided into K parts along the direction, and different parts respectively correspond to K groups of the white light sources. The first lenticular lens respectively directs K groups of the timing light to travel in K groups of the directions. Each of the pixels 141 includes K sub-regions.

The second lenticular lens 130 respectively focuses the K groups of the timing light traveling in the K groups of the directions to K groups of the focus regions. The K groups of the focus regions respectively correspond to the K sub-regions.

When the light source module 110 includes a plurality of red light sources, a plurality of green light sources, and a plurality of blue light sources, the stereo display device 100 has a direction perpendicular to the long axis of each of the first cylindrical lenses 121. Each of the first cylindrical lenses 121 is divided into 3K parts along the direction. Different parts respectively correspond to K groups of the red light sources, K groups of the green light sources, and K groups of the blue light sources. The K groups of the red light sources, the K groups of the green light sources, and the K groups of the blue light sources form 3K groups of the timing light in K timings. The first lenticular lens 120 respectively directs the 3K groups of the timing light to travel in 3K groups of the directions. Each of the pixels includes K sub-regions, and each of the sub-regions includes a red sub-pixel sub-region, a blue sub-pixel sub-region, and a green sub-pixel sub-region. The second lenticular lens 130 respectively focuses the 3K groups of the timing light traveling in the 3K groups of the directions to 3K groups of the focus regions. The 3K groups of the focus regions respectively correspond to the K red sub-pixel sub-regions, the K blue sub-pixel sub-regions, and the K green sub-pixel sub-regions.

In some embodiments, the number of the sub-regions is K. For each of the pixels 141, the K sub-regions respectively transform the timing light into K pixel light, and the third lenticular lens 150 respectively directs the K pixel light to K views.

By performing two optical Fourier transforms on different groups of the timing light from the light source module 110 by the first lenticular lens 120 and the second lenticular lens 130, different groups of the timing light will be respectively focused to different sub-regions of each of the pixels 141. Because different groups of the timing light focused to different sub-regions of each of the pixels 141 are respectively generated in different timings, pixels 141 can display different images in different timings, such that the pixel light transformed from different groups of the timing light focused to different sub-regions of the pixels 141 display different images. Because pixel light formed by different sub-regions of the pixels will be directed to different views by the third lenticular lens 151, the pixel light formed in different timings will be directed to different views by the third lenticular lens 150. For example, when there are a first timing and a second timing in a cycle, the pixel light formed in the first timing is directed to nine views by the third lenticular lens 150, and the pixel light formed in the second timing is directed to other nine views by the third lenticular lens 150, the image resolution observed by the user in each view will be one-ninth of the resolution of the display module 140, but eighteen images in eighteen views are generated by the stereo display device 100. In other words, the stereo display device 100 uses a simple optical configuration to generate the spatial-multiplex effect and the time-multiplex effect. The spatial-multiplex effect generates K different images in K views when the image resolution observed by the user in each view is 1/K of the resolution of the display module 140. The time-multiplex effect makes the number of the views become N times of the original number (the multiplier equals the number of the timings), such that the number of views becomes N×K.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, 6th paragraph. In particular, the use of "step of" in the claims herein is not intended to invoke the provisions of 35 U.S.C. § 112, 6th paragraph.

What is claimed is:

1. A stereo display device having a first direction and a second direction perpendicular to the first direction, comprising:
    a light source module configured to provide a plurality of groups of timing light from a plurality of groups of light sources coming sequentially;
    a first lenticular lens disposed in front of the light source module and configured to respectively direct the timing light from the light source module to travel in a plurality of groups of directions, wherein the light source module is located on a focal plane of the first lenticular lens, and the first lenticular lens has a plurality of first cylindrical lenses disposed slanted with respect to the first direction and the second direction;
    a second lenticular lens disposed in front of the first lenticular lens, wherein the first lenticular lens is disposed between the light source module and the second lenticular lens, and the second lenticular lens has a plurality of second cylindrical lenses disposed slanted with respect to the first direction and the second direction;
    a display module disposed in front of the second lenticular lens, wherein the second lenticular lens is disposed between the first lenticular lens and the display module, and the display module is located on a focal plane of the second lenticular lens, the display module comprises a plurality of pixels, each of the pixels comprises a plurality of sub-regions, the second lenticular lens is configured to focus the timing light traveling in the groups of the directions to a plurality of groups of focus regions, the focus regions respectively correspond to the sub-regions, and the display module is configured to transform the timing light focused on the focus regions into a plurality of groups of pixel light; and
    a third lenticular lens disposed in front of the display module and configured to respectively direct the pixel light to a plurality of views, and the third lenticular lens has a plurality of third cylindrical lenses disposed slanted with respect to the first direction and the second direction.

2. The stereo display device of claim 1, wherein the pixels are disposed along the first direction and the second direction.

3. The stereo display device of claim 1, wherein a long axis of each of the first cylindrical lenses, a long axis of each of the second cylindrical lenses, and a long axis of each of the third cylindrical lenses are parallel to each other.

4. The stereo display device of claim 1, wherein the display module is located on a focal plane of the third lenticular lens.

5. The stereo display device of claim 4, wherein each of the first cylindrical lenses has a pitch along the first direction, each of the pixels comprises a plurality of sub-pixels, the sub-pixels have a spacing between adjacent two of the centers of the sub-pixels along the first direction, the first lenticular lens has a first focal length, the second lenticular lens has a second focal length, a ratio of the pitch and the spacing is the same with a ratio of the first focal length and the second focal length.

6. The stereo display device of claim 1, wherein the groups of light sources comprise a plurality of white light sources.

7. The stereo display device of claim 6, wherein the first lenticular lens has a plurality of first cylindrical lenses, the stereo display device has a third direction perpendicular to a long axis of each of the first cylindrical lenses, each of the first cylindrical lenses is divided into K parts along the third direction, the K parts respectively correspond to K groups of the white light sources, the first lenticular lens is configured to respectively direct K groups of the timing light to travel in K groups of the directions, each of the pixels comprises K sub-regions, the second lenticular lens is configured to respectively focus the K groups of the timing light traveling in the K groups of the directions to K groups of the focus regions, and the K groups of the focus regions respectively correspond to the K sub-regions.

8. The stereo display device of claim 1, wherein the groups of light sources comprise a plurality of red light sources, a plurality of green light sources, and a plurality of blue light sources.

9. The stereo display device of claim 8, wherein the first lenticular lens has a plurality of first cylindrical lenses, the stereo display device has a third direction perpendicular to a long axis of each of the first cylindrical lenses, each of the first cylindrical lenses is divided into 3K parts along the third direction, the 3K parts respectively correspond to K groups of the red light sources, K groups of the green light sources, and K groups of the blue light sources, the K groups of the red light sources, the K groups of the green light sources, and the K groups of the blue light sources form 3K groups of the timing light in K timings, the first lenticular lens is configured to respectively direct the 3K groups of the timing light to travel in 3K groups of directions, each of the pixels comprises K sub-regions, each of the K sub-regions comprises a red sub-pixel sub-region, a blue sub-pixel sub-region, and a green sub-pixel sub-region, the second lenticular lens is configured to respectively focus the 3K groups of the timing light traveling in the 3K groups of the directions to 3K groups of the focus regions, and the 3K groups of the focus regions respectively correspond to the K red sub-pixel sub-regions, the K blue sub-pixel sub-regions, and the K green sub-pixel sub-regions.

10. The stereo display device of claim 1, wherein a number of the sub-regions is K, for each of the pixels, the K sub-regions respectively transform the timing light into K pixel light, and the third lenticular lens is configured to respectively direct the K pixel light to K views.

* * * * *